United States Patent [19]

Nakao et al.

[11] 4,138,906
[45] Feb. 13, 1979

[54] POWER DISTRIBUTING APPARATUS FOR VEHICLES

[75] Inventors: Toshiyuki Nakao, Chiryu; Shunichi Kawai, Toyota; Hiroji Yamaguchi, Kariya, all of Japan

[73] Assignee: Aisin Seiki Kabushiki Kaisha, Kariya, Japan

[21] Appl. No.: 805,359

[22] Filed: Jun. 10, 1977

[30] Foreign Application Priority Data

Jun. 22, 1976 [JP] Japan .................................. 51-73719

[51] Int. Cl.² ............................................. F16H 37/06
[52] U.S. Cl. .................................... 74/674; 74/665 R
[58] Field of Search ................. 74/674, 665 R, 665 G, 74/665 F

[56] References Cited

U.S. PATENT DOCUMENTS 3,548,679  12/1970  Woodford .............................. 74/674

Primary Examiner—Benjamin W. Wyche
Assistant Examiner—Frank H. McKenzie, Jr.
Attorney, Agent, or Firm—Burns, Doane, Swecker & Mathis

[57] ABSTRACT

A power distributing apparatus for vehicles includes an input shaft, first and second output shafts, a simple planetary gear set having a carrier operatively connected to the input shaft, a ring gear cooperating with the first output shaft, and a sun gear selectively engaged with the second output shaft, and means for selectively engaging the carrier and the sun gear and for integrally rotating the sun gear and the carrier in the engaging state of the sun gear and the carrier, and for more slowly rotating the sun gear than the carrier in the disengaging state of the sun gear and the carrier.

7 Claims, 7 Drawing Figures

POWER DISTRIBUTING APPARATUS FOR VEHICLES

BACKGROUND OF THE INVENTION

1. Field of the Invention

The present invention relates generally to a power distributing apparatus and more particularly to such an apparatus for vehicles.

2. Description of the Prior Art

A conventional power distributing apparatus, such as that employing a differential apparatus of first and second output shafts, is constituted by a simple planetary gear which is also utilized for an over-drive apparatus of first output shaft so as to improve a high speed running efficiency, a silent efficiency and a fuel expenses efficiency for vehicles, an input shaft and a carrier of simple planetary gear, a ring gear of simple planetary gear and the first output shaft, and a sun gear of simple planetary gear and the second output shaft are capable of selectively cooperating with each other, and when only the first output shaft is driven the sun gear of simple planetary gear is fixed to a case. When there is no changing between the input shaft and the carrier, the ring gear and the first output shaft, and the sun gear and the second output shaft by various factors in this apparatus, both of torque distributing ratio and over-drive ratio are determined by a ratio of gear number. For example, supposing that the gear number of ring gear is 65 and the gear number of sun gear is 35, the torque distributing ratio (torque of the second output shaft/torque of the first output shaft) becomes 35/65 and the over-drive ratio (rotational number of the input shaft/rotational number of the first output shaft) becomes 0.65. However, it is desirous that the torque distributing ratio responds to a load distributing ratio of each vehicle shaft and it is generally 30-50/70-50 while the over-drive ratio is determined on the basis of the relation between engine output and load and is generally 0.8. Accordingly, both the torque distributing ratio and the over-drive ratio are not capable of adjusting to an appropriate value.

SUMMARY OF THE INVENTION

The present invention provides an improved power distributing apparatus for vehicles which obviates the drawback of the above-mentioned conventional power distributing apparatus.

The power distributing apparatus for vehicles according to the present invention provides a unique and highly simplified power distributing apparatus for vehicles. It is capable of adjusting both as to torque distributing ratio and as to over-drive ratio to an appropriate value at the above-mentioned limiting state, and a sun gear and a carrier are voluntarily cooperated to each other and a connecting means for integrally rotating the sun gear and the carrier in the engaging state of the sun gear and the carrier and for more slowly rotating the sun gear than the carrier in the disengaging state of the sun gear and the carrier.

The foregoing and other objects, features and advantages of the invention will be apparent from the following more particular description of preferred embodiments of the invention, as illustrated in the accompanying drawings in which:

DETAILED DESCRIPTION OF THE PREFERRED EMBODIMENTS

Figure 1:
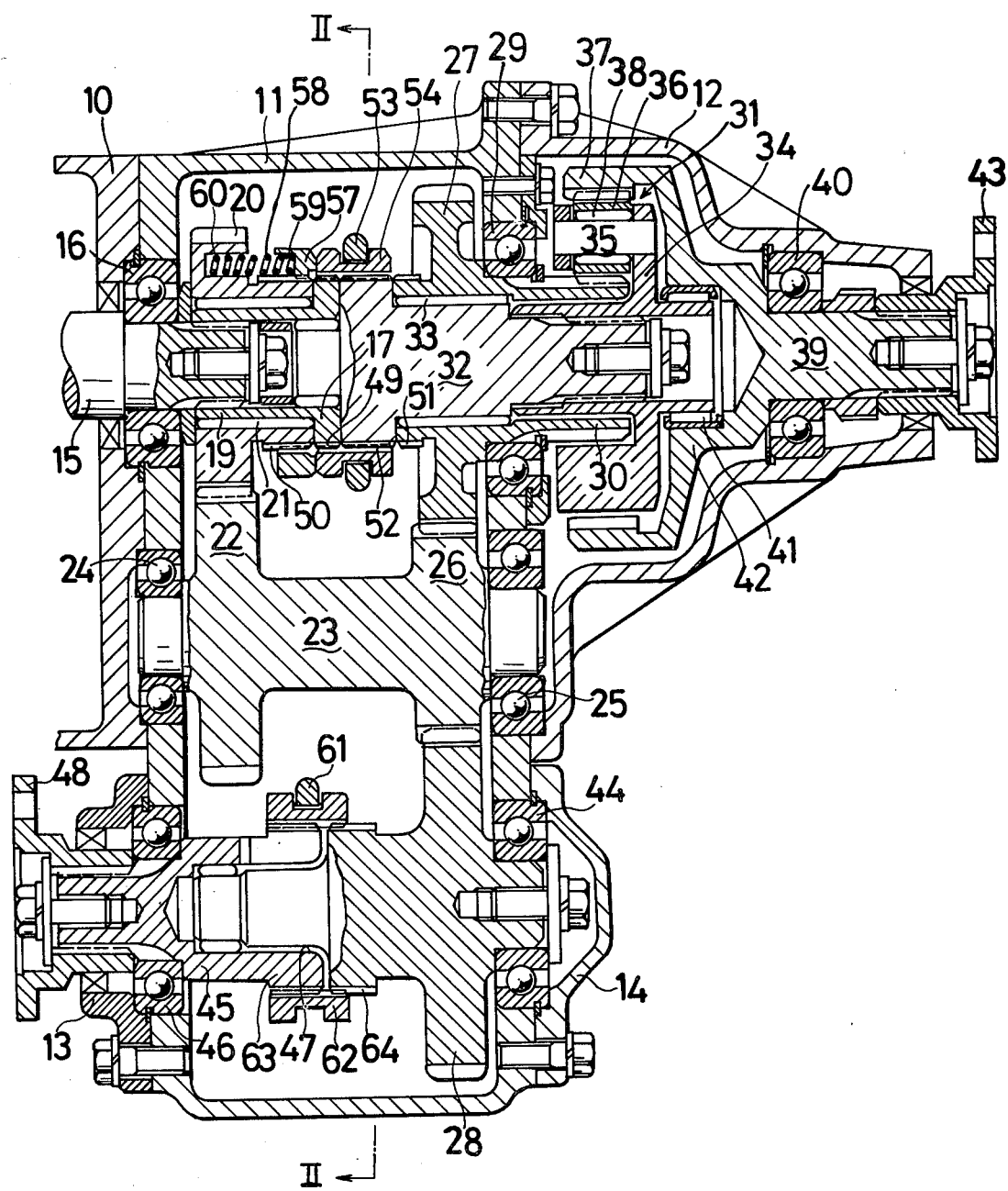
FIG. 1 is a sectional view of the power distributing apparatus according to the present invention.
Figure 2:
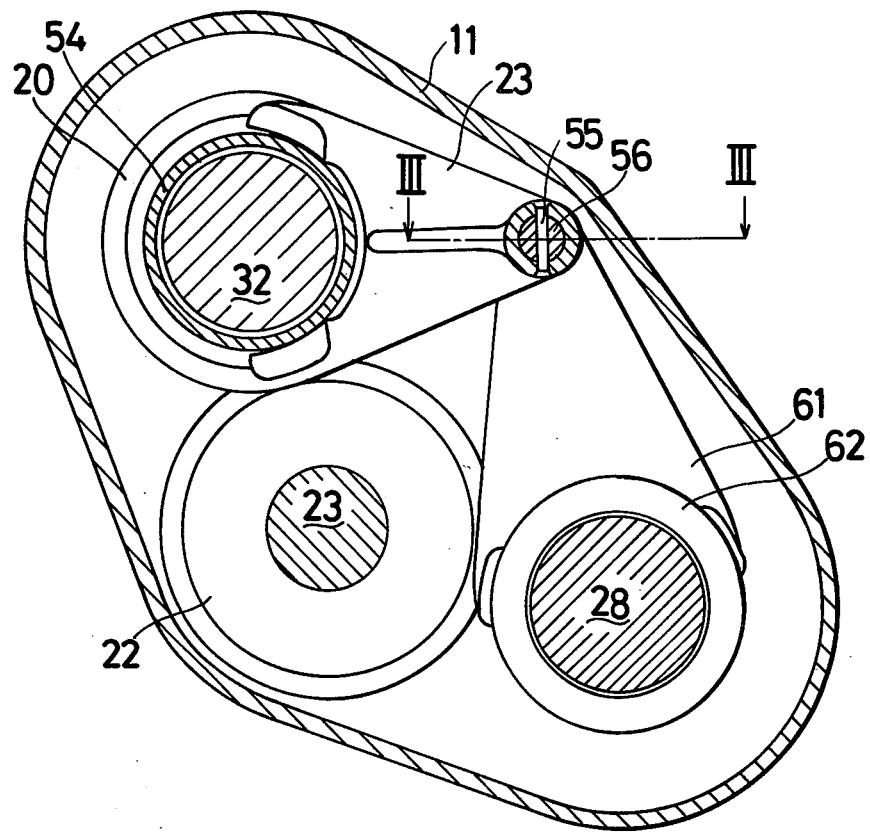
FIG. 2 is a view, similar to FIG. 1, taken along the line II—II of FIG. 1.
Figure 3:
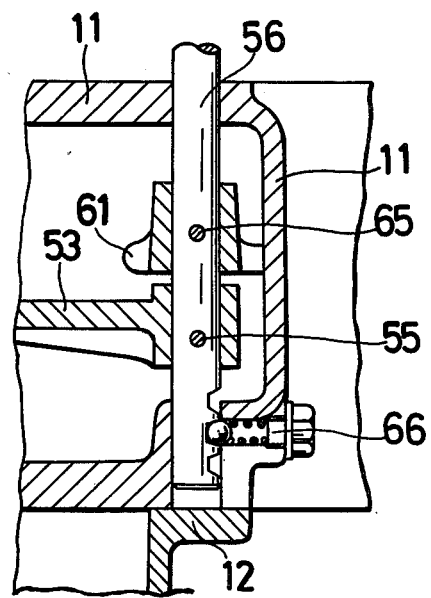
FIG. 3 is a view, similar to FIG. 1, taken along the line III—III of FIG. 2.
Figure 4:
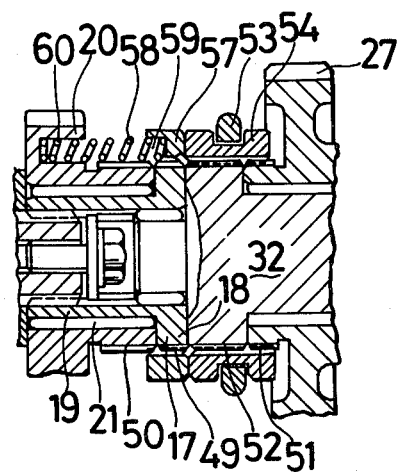
FIGS. 4-7 inclusive are views, similar to FIG. 1, however showing each actuating state in various shifting positions.
Figure 5:
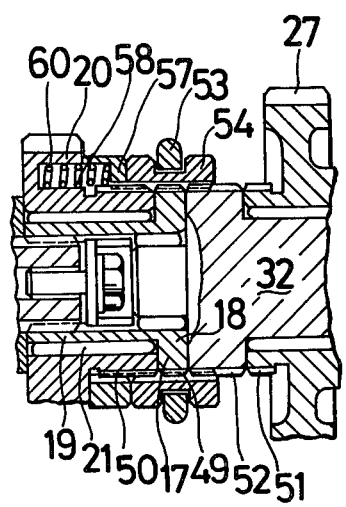
Figure 6:
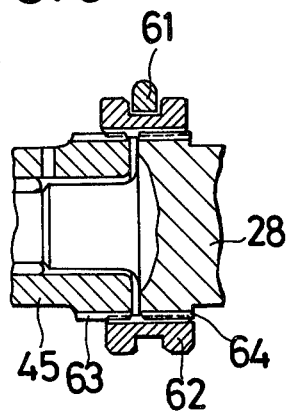
Figure 7:
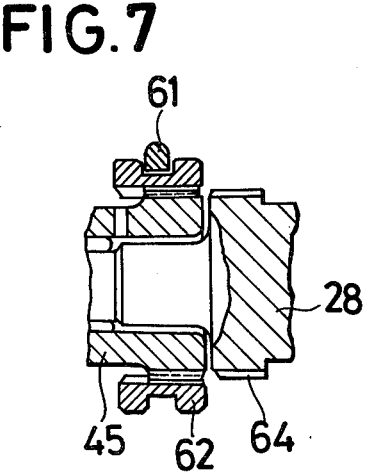

As best seen in FIG. 1, 10 is a speed changer case to which a case 11 is fixed. An extention housing 12 and case covers 13, 14 are fixedly attached to case 11. An input shaft 15 is rotatably supported by a bearing 16 fixed to case 11, this input shaft 15 serves also as an output shaft of speed changer and integrally connects to a hub 17. Hub 17 is provided with a flange portion 18 and a shaft portion 19. A gear 20 is rotatably supported by shaft portion 19 of hub 17 through a bearing 21, and is meshed with a gear 22 formed on an intermediate shaft 23 which is provided in parallel with input shaft 15. Intermediate shaft 23 is rotatably supported by bearings 24, 25 fixed to case 11 and is further formed with a gear 26. The gear 26 of intermediate shaft 23 is meshed with a gear 27 which is coaxially provided with input shaft 15 and is meshed with a gear 28 which is provided in parallel with input shaft 15.

Gear 27 is rotatably supported by a bearing 29 fixed to case 11, and is formed on a sun gear 30 of a simple planetary gear 31 within extension housing 12. A shaft 32 is rotatably supported by gear 27 through a bearing 33, and is integrally connected to a carrier 34 of simple planetary gear 31. A plurality of pinion shafts 35 are fixedly attached to the carrier and a pinion 36 meshed with the sun gear 30 and a ring gear 37 is rotatably supported by the plurality of pinion shafts 35 through a bearing 38.

The ring gear 37 is formed on a first output shaft 39 which is rotatably supported by a bearing 40 fixed to the extension housing 12. A bearing 41 is fixed to an aperture 42 of first output shaft 39 and rotatably supports carrier 34. The first output shaft 39 is further provided with a flange member 43 for connecting to a propeller shaft (not shown) for a rear wheel side.

Gear 28 is rotatably supported by a bearing 44 fixed to case 11, and a second output shaft 45, which is coaxially provided with the gear 28, is rotatably supported by a bearing 46. Gear 28 is rotatably supported within an aperture 47 of second output shaft 45. Second output shaft 45 is provided with a flange member 48 for connecting to a propeller shaft (not shown) for a front wheel side.

In FIGS. 1 to 7 inclusive, an outer spline 49 is formed on an outer circumference of flange portion 18 of hub 17, and an outer spline 50 is formed on gear 20 and an outer spline 51 is formed on shaft 32; also, an outer spline 52 is formed on gear 27. These outer splines 49, 50, 51, 52 have the same radii.

A shift fork 53 is engaged with a clutch sleeve 54 connected to the outer splines 52, 49 by spline engagement in FIG. 1. Shift fork 53 is fixedly attached by a pin 55 to a fork shaft 56 slidably supported by case 11, as best seen from FIG. 3. The clutch sleeve 54 is axially moved by operating a shift lever (not shown) through fork shaft 56 and shift fork 53. A clutch sleeve 57 which is engaged with the outer spline 50 by spline engagement is rightwardly depressed toward the clutch sleeve 54 by a spring 58 interposed between an aperture 59 provided in the clutch sleeve 57 and an aperture 60 provided in the gear 20, and is followed to the axial movement of clutch sleeve 54. It can be easily understood that the engaging portion of shift fork 53 is channel-shaped in cross-section and projecting portions are formed on the outer cicumference of clutch sleeves 54, 57 thereby engaging the engaging portion of shift fork 53 with said projecting portions.

A shift fork 61 is engaged with a clutch sleeve 62 engaged with an outer spline 63 formed on the second output shaft 45, and an outer spline 64 formed on the gear 28 by spline engagement and is fixed to the fork shaft 56 by pin 65.

The shift lever (not shown) has three shifting positions, that is, a first shifting position, a second shifting position and a third shifting position. The clutch sleeves 54, 57 are moved into the state illustrated in FIG. 5 in the first shifting position of shift lever (not shown), and the clutch sleeve 62 is moved into the state of FIG. 7, the clutch sleeves 54, 57, 62 are moved into the state of FIG. 1 in the second shifting position thereof, and the clutch sleeves 54, 57 are moved into the state of FIG. 4 and the clutch 62 is moved into the state of FIG. 6 in the third shifting position thereof. These three shifting positions are maintained by a lock-ball apparatus 66 disposed between fork shaft 56 and case 11.

Gears 27, 28 have the same number of gear teeth, while the number of gear teeth on gear 26 is fewer than that of gear 27, and the number of gear teeth of gear 22 is greater than that of gear 20.

The operation according to the invention will now be described hereinbelow in detail.

When the shift lever (not shown) is shifted to the second shifting position so as to run by front and rear wheel drive on a road, clutch sleeve 54 is engaged with outer spline 49 of hub 17 and outer spline 52 of shaft 32 by spline engagement, and clutch sleeve 62 is engaged with outer spline 63 of second output shaft 45 and outer spline 64 of gear 28 by a spline engagement thereby engaging second output shaft 45 with gear 28. In this state, the power supplied to input shaft 15 is transmitted to carrier 34 of simple planetary gear 31 via shaft 32, and is distributed by the simple planetary gear 31 in two directions of which one is transmitted from ring gear 37 to first output shaft 39 and of which the other is transmitted from sun gear 30 to second output shaft 45 via gears 27, 26, 28. And at this state, the simple planetary gear 31 activates a differential operation. As the gears 27, 28 have the same gear numbers, the torque distributing ratio to both output shafts 39, 45 is gear number of sun gear/gear number of ring gear. Supposing that the gear number of sun gear is 35 and the gear number of ring gear is 65, the above ratio becomes 35/65.

When the shift lever (not shown) is shifted to the third shifting position so as to run on a rough road, the clutch sleeve 54 is engaged with outer spline 52 of shaft 32 and outer spline 51 of gear 27 thereby integrating the shaft 32 and the gear 27, and clutch sleeve 57 is engaged with outer spline 50 of gear 20 and outer spline 49 of hub 17 thereby engaging gear 20 with input shaft 15, while clutch sleeve 62 retains the engaging state of second output shaft 45 and gear 28. In this state, the simple planetary gear 31 is in a locking state by integration of shaft 32 and gear 27, and the power applied to the input shaft 15 is transmitted to the gear 26 via gears 20, 22, intermediate shaft 23 and is further transmitted from gear 26 to first output shaft 39 via gear 27 and simple planetary gear 31, and also from gear 26 to second output shaft 45 via gear 28. At this time, there is no differential movement between front and rear propeller shafts (not shown), that is, there is a direct driving operation.

When the shift lever (not shown) is shifted to the first shifting position so as to run rear wheel drive on a highway, clutch sleeve 54 is engaged with outer spline 50 of gear 20 and outer spline 49 of hub 17, thereby engaging shaft 32 and gear 20 with input shaft 15, and clutch sleeve 62 is disengaged from gear 28 thereby disengaging second output shaft 45 from gear 28. In this state, the power supplied to input shaft 15 is distributed to shaft 32 and gear 20. The power supplied to shaft 32 is transmitted to carrier 34 of simple planetary gear 31, and the power supplied to gear 20 is transmitted to sun gear 30 of simple planetary gear 31 via gear 22, intermediate shaft 23 and gears 26, 27, and these components of power are transmitted from ring gear 37 of simple planetary gear 31 to first output shaft 39. Under these conditions, the gear number of gear 22 is more than that of gear 20 and the gear number of gear 27 is more than that of gear 26, so that the rotational number of sun gear 30 is less than that of carrier 34 thereby operating as overdrive by simple planetary gear 31. Supposing that the reduction speed ratio from gear 20 to gear 27 is 1.8, the over-drive ratio becomes about 0.807.

Obviously, many modifications and variations of the present invention are possible in the light of the above teachings. It is to be understood therefore, that within the scope of the appended claims, the present invention may be practiced otherwise than as specifically described herein.

We claim:

1. A power distributing apparatus for vehicles comprising:
    an input shaft;
    first and second output shafts; and
    a simple planetary gear set including a carrier operatively connected to said input shaft, planet gears carried by said carrier, a ring gear operatively connected with said first output shaft and said planet gears, and a sun gear operably connected to said second output shaft and said planet gears; and
    power transmitting means connected to said input shaft and shiftable between
        one operating position in which said power transmitting means is drivingly connected to said carrier such that the latter rotates both said ring gear and said sun gear, to supply power to said first and second output shafts through said carrier, and
        another operating position in which said power transmitting means is drivingly connected separately to said carrier and said sun gear to transmit power from said input shaft separately to said carrier and said sun gear in a manner rotating said sun gear more slowly than said carrier.

2. A power distributing apparatus for vehicles as set forth in claim 1 wherein said power transmitting means comprises:
    a hub member drivingly connected to said input shaft;
    a first gear member rotatably supported by said hub member;

a second gear member drivingly connected to said sun gear;

a main shaft member rotatably supported coaxially within said second gear member and drivingly connected to said carrier;

an intermediate shaft member drivingly connectable to said first and second gear members;

clutch sleeve means drivingly interconnecting said hub member and said main shaft member to the exclusion of said first and second gears so that said main shaft drives said carrier in said one operating position of said power transmitting means; said clutch sleeve means mounted for axial movement to alternately engage said first gear member with said main shaft member so that said first gear member drives said intermediate shaft, said second gear member, and said sun gear while said main shaft member drives said carrier in said other operating position of said power transmitting means; and said second gear member with said main shaft member in an additional operating position of said power transmitting means.

3. A power distributing apparatus for vehicles as set forth in claim 2 wherein said apparatus further comprises:

a third gear member drivingly engageable with said intermediate shaft member; and additional clutch sleeve means selectively engaging said second output shaft with said third gear member.

4. A power distributing apparatus for vehicles as set forth in claim 2 wherein said main shaft member directly carries said carrier of said simple planetary gear set.

5. A power distributing apparatus for vehicles as set forth in claim 2 wherein said second gear member is integral with said sun gear of said simple planetary gear set.

6. A power distributing apparatus for vehicles as set forth in claim 2, wherein said clutch sleeve means comprises a first clutch sleeve member for coupling said hub member, said sleeve member, and said second gear member and a second clutch sleeve member arranged to follow said first clutch sleeve member and operable to couple said hub member and said first gear member.

7. Apparatus according to claim 1, wherein said power transmitting means includes means disengaging power transmission to said second output shaft in said other position of said power transmitting means.

* * * * *